(12) United States Patent
Cohen et al.

(10) Patent No.: US 11,089,830 B2
(45) Date of Patent: Aug. 17, 2021

(54) COMPOSITE MATERIAL AND ASSOCIATED PROTECTION DEVICES

(71) Applicant: DIPLOSYSTEM, Marseilles (FR)

(72) Inventors: Serge Cohen, Marseilles (FR); François Silhol, Marseilles (FR)

(73) Assignee: DIPLOSYSTEM, Marseilles (FR)

( * ) Notice: Subject to any disclaimer, the term of this patent is extended or adjusted under 35 U.S.C. 154(b) by 0 days.

(21) Appl. No.: 15/549,564

(22) PCT Filed: Feb. 4, 2016

(86) PCT No.: PCT/FR2016/050241
§ 371 (c)(1),
(2) Date: Aug. 8, 2017

(87) PCT Pub. No.: WO2016/128651
PCT Pub. Date: Aug. 18, 2016

(65) Prior Publication Data
US 2018/0035739 A1 Feb. 8, 2018

(30) Foreign Application Priority Data

Feb. 10, 2015 (FR) ...................... 1551087

(51) Int. Cl.
*A42B 3/06* (2006.01)
*B32B 27/06* (2006.01)
(Continued)

(52) U.S. Cl.
CPC .............. *A42B 3/063* (2013.01); *A42B 3/067* (2013.01); *A42B 3/125* (2013.01); *A42C 2/00* (2013.01);
(Continued)

(58) Field of Classification Search
CPC ........... A42B 3/046; A42B 3/06; A42B 3/063; A42B 3/064; A42B 3/067
(Continued)

(56) References Cited

U.S. PATENT DOCUMENTS 3,877,076 A * 4/1975 Summers ................ A42B 3/124
2/414
4,853,980 A * 8/1989 Zarotti ................... A42B 3/121
2/413
(Continued)

FOREIGN PATENT DOCUMENTS

| EP | 1 832 186 A2 | 9/2007 |
|----|--------------|--------|
| EP | 1 897 609 A2 | 3/2008 |
| GB | 2497345 A | 6/2013 |

OTHER PUBLICATIONS

Douglas Slatter, Textbook of Small Animal Surgery, 2003, Saunders, Third Edition, p. 1845 (Year: 2003).*
(Continued)

*Primary Examiner* — Alissa L Hoey
*Assistant Examiner* — Patrick J. Lynch
(74) *Attorney, Agent, or Firm* — Buchanan Ingersoll & Rooney PC

(57) ABSTRACT

A composite material includes an upper layer, a lower layer and means arranged so as to diffuse substantially transversely at least part of the kinetic energy induced by an impact on one of said layers, said means cooperating on both sides, with the upper layer and the lower layer. The diffusion means can consist in a network of interassembled base elements and of cavities, forming a three-dimensional structure. A protection device comprising includes an insert consisting of the composite material.

6 Claims, 3 Drawing Sheets

(51) Int. Cl.
  *B32B 3/08* (2006.01)
  *B32B 3/26* (2006.01)
  *B32B 27/08* (2006.01)
  *B32B 27/18* (2006.01)
  *F16F 13/04* (2006.01)
  *A42B 3/12* (2006.01)
  *A42C 2/00* (2006.01)

(52) U.S. Cl.
  CPC .............. *B32B 3/08* (2013.01); *B32B 3/085* (2013.01); *B32B 3/26* (2013.01); *B32B 27/065* (2013.01); *B32B 27/08* (2013.01); *B32B 27/18* (2013.01); *F16F 13/04* (2013.01); *B32B 2260/00* (2013.01); *B32B 2307/56* (2013.01); *B32B 2437/04* (2013.01); *B32B 2571/00* (2013.01)

(58) Field of Classification Search
  USPC ........................................................... 2/412
  See application file for complete search history.

(56) References Cited

U.S. PATENT DOCUMENTS

| | | | | |
|---|---|---|---|---|
| 8,196,226 | B1* | 6/2012 | Schuh | A42B 3/046 2/410 |
| 9,826,954 | B2* | 11/2017 | Petel | A61B 5/1128 |
| 2004/0003452 | A1* | 1/2004 | Schiebl | A42B 3/08 2/421 |
| 2009/0077723 | A1* | 3/2009 | Mead | A47C 27/085 2/455 |
| 2009/0324927 | A1 | 12/2009 | Palmer et al. | |
| 2010/0221521 | A1 | 9/2010 | Wagner et al. | |
| 2012/0204327 | A1 | 8/2012 | Faden et al. | |
| 2012/0304367 | A1* | 12/2012 | Howard | A42B 3/046 2/413 |
| 2013/0122256 | A1* | 5/2013 | Kleiven | A42B 3/064 428/158 |
| 2014/0045962 | A1* | 2/2014 | Schofalvi | G01N 21/25 521/159 |
| 2014/0223641 | A1* | 8/2014 | Henderson | A42B 3/065 2/411 |
| 2016/0058092 | A1* | 3/2016 | Aldino | A42B 3/128 2/412 |
| 2016/0255900 | A1* | 9/2016 | Browd | A42B 3/121 |
| 2016/0278470 | A1* | 9/2016 | Posner | A42B 3/064 |
| 2018/0070666 | A1* | 3/2018 | Todaro | A42B 3/062 |

OTHER PUBLICATIONS

*International Search Report (PCT/ISA/210) dated Mar. 31, 2016, by the European Patent Office as the International Searching Authority for International Application No. PCT/FR2016/050241.
*Written Opinion (PCT/ISA/237) dated Mar. 31, 2016, by the European Patent Office as the International Searching Authority for International Application No. PCT/FR2016/050241.

* cited by examiner

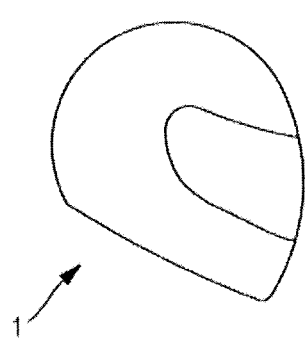
FIG. 1a
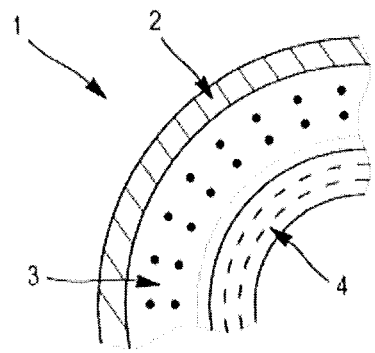
FIG. 1b
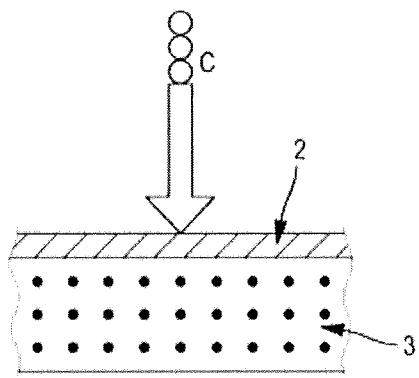
FIG. 2a
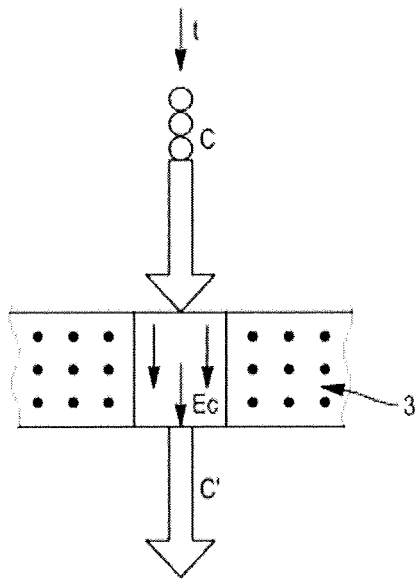

COMPOSITE MATERIAL AND ASSOCIATED PROTECTION DEVICES

The invention relates to a composite material applied to the field of protection devices. The latter are utilized for all types of uses. These include, preferably but non-limitingly, individual protection elements, such as motorcycle, car or at-risk sports helmets, knee pads, shin guards, elbow guards, dorsal vests, parachuting shoes, etc. They also constitute passive protection elements for locomotive means, such as car or truck bumpers, or safety barriers or walls in speedways.

As one preferred but non-limiting example, the composite material according to the invention will be considered as it applies to an insert within a motorcycle helmet.

As motorcycle use became widespread, protection for motorcycle drivers' and potential passengers' heads was quickly recognized as essential for the safety of the driver and any potential passenger. Indeed, in the 1920s, drivers wore only a cloth hat or leather helmets, the latter being similar to those worn by automobile drivers at the same time. Experience quickly showed that the protection needs were very different and that those of motorcycle travelers were crucial for their survival. For these reasons, so-called "modern" motorcycle helmets were developed.

The primary function of a motorcycle helmet is to protect the heads of persons on a motorcycle, or more generally a two-wheeled motorized vehicle, in particular to avoid cranial trauma sometimes causing cerebral hemorrhages, by lessening impacts with the ground or any obstacle present on the road in case of fall, but also to protect said persons from any abrasion caused by sliding on the pavement. Such a helmet also makes it possible to protect the driver and/or passenger from poor weather conditions, such as, but not limited to, wind or rain, or insects. It may also comprise accessory or complementary devices, such as, advantageously but non-limiting, an air-conditioning or heating device, or an audio device to listen to music or a traveling companion.

So-called "modern" helmets have a globally similar design. They are illustrated in connection with FIGS. 1a and 1b. Such helmets 1 are advantageously, but non-limitingly, made up of three main elements:
 a rigid outer cap or shell 2;
 an inner cap or cover 3;
 comfort padding 4.

The protection provided by the helmet is provided by the absorption, via said helmet, of a more or less significant portion, or even all, of the kinetic energy generated by an impact on said helmet. Throughout this document, "impact" will refer to any physical shock caused by a collision between the motorcyclist's head and the ground or other obstacles. The greater the quantity of energy absorbed by the deformation or destruction of the helmet, the more the motorcyclist's head is protected. Thus, the partial or complete destruction of the helmets takes place in many cases upon such impacts. As a result, it is always necessary to change helmets after an accident or impact, since the integrity of the helmet has been altered by the impact, thereby decreasing, or even eliminating, the "protective" function of said helmet.

The three main elements each have their own function.

The outer shell 2 guarantees a certain resistance to minor shocks, such as, by way of non-limiting examples, dropping the helmet on the ground, an altercation, or a collision with a sharp object. It also protects the material of the inner cap 3 from any outside attack, such as humidity, UV rays, etc. It lastly makes it possible to make helmets attractive and amusing by allowing esthetic variations. The material making up such an outer shell 2 must thus meet many requirements: it must in fact be solid, rigid and light. Advantageously but non-limitingly, an outer shell 2 can be made from polycarbonate or any other equivalent plastic material, composite or fibrous materials, such as, but not limited to, poly(P-phenylene terephthalamide) (PPD-T), also known as "Kevlar®," glass fiber, carbon fiber or polymers of the ultrahigh mass polyethylene (UHMPE) type, also known as "Dyneema®."

The inner cap 3 performs the majority of the "protective" function of the helmet. Indeed, the inner cap 3 is designed so as to absorb the kinetic energy generated by any impact or shock. It must, however, have reasonable dimensions and an acceptable mass for a transportable object. Furthermore, the kinetic energy transmitted through the helmet to the cranial cavity must be below a critical value, beyond which major damage occurs. Indeed, when an impact occurs, the objects deform and are set in motion. It is the transmission of a more or less significant quantity of kinetic energy that causes more or less significant cerebral lesions. Thus, to preserve the integrity of the cranial cavity, such an inner cap 3 is generally made up of expanded materials, such as, but not limited to, polystyrene, polypropylene or the like.

The padding 4 makes it possible to impart comfort to the user, while ensuring smooth contact between the passenger's head and the other components of the helmet. Furthermore, such padding 4 provides other properties, such as moisture resistance, a certain texture or odor, and protection against cold, noise from the engine or air currents. Said padding 4 can advantageously comprise a polystyrene trim equipped with non-irritating fabrics, sometimes treated with anti-allergy or antibacterial products.

FIG. 2a schematically illustrates the absorption mode of an impact within a so-called "modern" motorcycle helmet.

An impact or shock C takes place with the ground or any obstacle present in the vicinity of the helmet. Said shock C is generally oriented against and/or on the outer shell 2 of a motorcycle helmet 1. When the outer shell 2 is constructed from a material adapted to work correctly, a portion of the kinetic energy caused by the shock C can be deviated by "sliding" above said outer shell 2 or ricocheting off the ground or at the encountered obstacle. The inner cap 3, intact at the time of the shock C, absorbs all or part of the kinetic energy $E_C$ created by the shock C. This absorption is provided by the presence of expanded material, i.e., the volume of said material has previously been increased by injecting a gas. Injecting gas causes the creation of base elements called cells, which, assembled with one another, form the material. The expanded materials are biphasic materials made up of a "skeleton" made from a predefined material and gas present within the cells. This increase in volume allows a better distribution of the kinetic energy $E_C$ since the speed of the shock C is decreased within the expanded material. The absorption of the kinetic energy $E_C$ depends on the expanded material, consequently the inner cap 3.

Nevertheless, within expanded materials, the kinetic energy $E_C$ propagates along the same direction as the shockwave C (direction shown by thin arrows in FIG. 2a). Depending on the violence of this shock, the kinetic energy $E_C$ is not absorbed in full and part C' of the shock is thus transmitted to the passenger's head. Cranial traumas are the most frequently encountered injuries when a motorcyclist falls.

Faced with the drawbacks that may be imparted by the expanded materials commonly used on the market, other materials have been developed. Among these materials, by way of non-limiting example, D3o® is widely used, in particular, advantageously but non-limitingly, in passive protection such as jackets and gloves suitable for drivers and/or passengers of two-wheeled vehicles. D3o® is a non-Newtonian expanding or rheo-thickening fluid, i.e., it has the particularity of changing mechanical behavior depending on whether it is manipulated slowly or quickly. D3o® is considered to be a material or protection of the "active and smart" type, since it is a shape memory material. Indeed, in the resting state, i.e., when it is manipulated slowly, D3o has the property of being malleable and/or flexible. When undergoing a shock, the modules making up the D3o® bind together to allow the hardening or stiffening of said material, thus making it possible to absorb and disperse the kinetic energy created by the impact. At the end, the D3o® returns to its resting state. Although D3o® has undeniable qualities, it also has a certain number of drawbacks. Because of its particular properties, D3O has low abrasion resistance. It is thus necessary to cover it with protective material, for example carbon or plastic, allowing it to retain its properties. Such additional protection creates several drawbacks, since part of the malleability of the product is lost, thereby causing a decrease in the absorption and/or dispersion of the kinetic energy induced by an impact, and ultimately, a reduction in the "protective power" of the D3o®.

The invention makes it possible to resolve all or some of the drawbacks raised by the known solutions.

Among the many advantages provided by a composite material according to the invention, we may cite that the latter makes it possible to:
  decrease the propagation of the kinetic energy created by an impact, and consequently provide more effective protection from shocks;
  spread and absorb the propagation of the kinetic energy created by an impact within said composite material;
  adapt to any type of protective device.

To that end, in particular provided is a composite material comprising an upper layer and a lower layer. To decrease, or even eliminate, the portion of kinetic energy propagated and created by an impact, and thus to improve the protection against said impact, the composite material according to the invention comprises means consisting of a network of base elements assembled to one another so as to form cavities, said elements being arranged to break under the effect of the kinetic energy induced by an impact on one of said layers, said means cooperating on either side with the upper layer and the lower layer.

Advantageously, to allow the creation of a sealed chamber, the upper layer and the lower layer can form a single and same entity, enclosing the diffusing means.

Advantageously but non-limitingly, the arrangement of the network of base elements of a composite material according to the invention can be regular, the base elements being identical.

Alternatively, the arrangement of the network of base elements of a composite material according to the invention can be random.

In order to facilitate the deformation of a composite material according to the invention, the network of base elements may include at least one rod.

Alternatively or additionally, the network of base elements may include at least one cell.

In order to facilitate the production of a composite material according to the invention, the upper layer, the lower layer and the network of base elements can be formed from a same material.

To increase the capacity to diffuse of all or part of the kinetic energy within a composite material according to the invention, the diffusing means may further include a fluid flowing within the cavities of the network.

Preferably, the fluid may be made up primarily of a gel.

To avoid any crushing phenomenon and prevent damage, or even complete destruction, of a composite material according to the invention, the fluid may occupy thirty to sixty percent of the space formed by the cavities of the network.

According to a second object, the invention relates to a method for manufacturing a composite material according to the invention. To simplify the manufacturing methods and thus save time and decrease costs, the method for manufacturing a composite material according to the invention comprises a step for extrusion of the network of base elements and cavities.

According to a third object, the invention relates to a protection device comprising an insert. To decrease the propagation of the kinetic energy created by a shock and thus increase the protective power of said device, said insert is made from a composite material according to the invention.

Additionally, to attest to the compliance of the protection device according to the invention, the latter may further comprise indicator means for the integrity of the composite material making up the insert.

In order to provide a quick inspection of a motorcycle helmet according to the invention, the indicator means may include a negative pressure valve associated with means delivering an indication perceptible by humans.

Alternatively or additionally, in order to provide a detailed and precise inspection of a protection device according to the invention, the indicator means may include a radiopaque substance.

More particularly, to decrease the propagation of the kinetic energy created by a shock toward the head of the two-wheeler passenger, the protection device may consist of a motorcycle helmet, including an outer cap, and an inner cover positioned between said outer cap and a comfort padding. To decrease the propagation of the kinetic energy created by a shock toward the head of a motorcycle passenger, and thus to increase the protective power of said motorcycle helmet, the latter may include an insert made up of a composite material according to the invention, said insert being positioned between the outer cap and the inner cover.

Other features and advantages will appear more clearly upon reading the following description and examining the figures that accompany it, among which:

FIGS. 1a and 1b, previously described, illustrate detailed views of a known so-called "modern" motorcycle helmet;

FIG. 2a, previously described, describes an impact absorption mode within a known so-called "modern" motorcycle helmet;

FIG. 2b shows a graphic description of an impact absorption mode within a motorcycle helmet according to the invention;

FIGS. 3a and 3b describe sectional views of two embodiments of a composite material according to the invention;

Figure 2B:
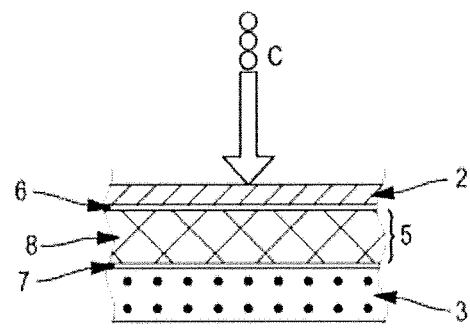
FIG. 2b shows a graphic description of the absorption of an impact by a composite material according the invention, for example, within a motorcycle helmet. Such a motorcycle helmet 1 is also described below in connection with FIG. 4.

Like the impact absorption mode described in connection with FIG. 2a, a shock C takes place with the ground or any obstacle present in the vicinity of the helmet. Said shock C is generally oriented against and/or on the outer shell 2 of a motorcycle helmet 1.

Similarly to modern motorcycle helmets, such a motorcycle helmet 1 advantageously includes a rigid outer cap or shell, an inner cap or cover 3, and a comfort padding 4. According to the example described in connection with FIG. 4, to decrease the propagation of the kinetic energy created by an impact with the head of a motorcycle passenger, and thus to increase the protective power of said motorcycle helmet, the latter includes an insert 5 made from a composite material according to the invention, said insert 5 being positioned between the outer cap 2 and the inner cover 3. "Insert" refers to any object or part having a composite material according the invention, included within the motorcycle helmet.

The inner cap 3 and the insert 5, the latter advantageously being made up of the composite material according to the invention, are intact at the time of the shock C. To protect the head effectively, all or part of the kinetic energy $E_C$ created by the shock C is advantageously absorbed by the combination of the insert 5 and the inner cap 3. Like the so-called modern helmets, the inner cap 3 is advantageously made up of expanded material, ensuring the absorption of part of the kinetic energy. However, as previously specified, the kinetic energy $E_C$ within the materials propagates in the same direction as the shockwave. To offset this drawback, the motorcycle helmet comprises an insert 5 advantageously made up of a composite material 5' according to the invention.

Figure 3A:
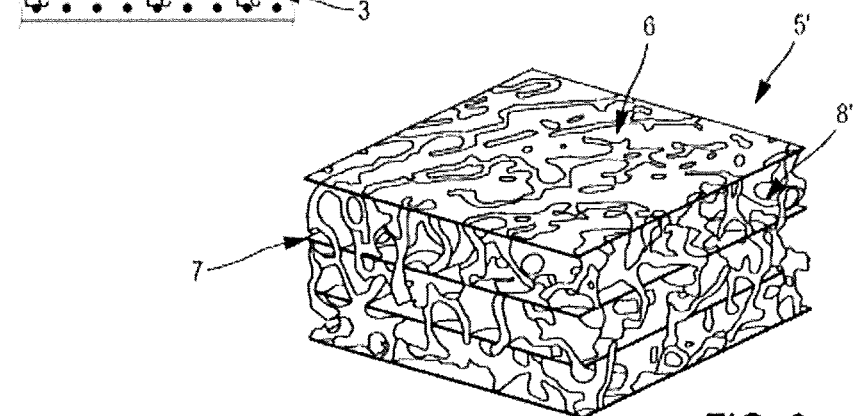
Figure 3B:
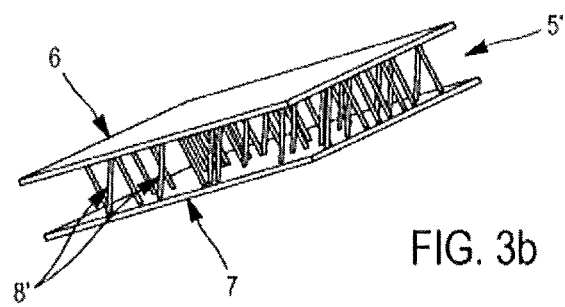

Such a composite material 5' is also described in connection with FIGS. 3a and 3b, showing two non-limiting embodiments of the composite material according to the invention. "Composite material" refers to any solid-phase assembly made up of at least two components, the respective qualities of which complete one another to form a material with improved overall performance: the two components advantageously have a high adhesion capacity. In principle, said composite material is made up of at least two components: a matrix, ensuring the cohesion of the material and the transmission of mechanical forces, a reinforcement serving as a framework to provide all or part of the mechanical forces, and optionally one or several additives, making it possible to modify and/or improve the physicochemical properties of the material. The reinforcement may advantageously be within a matrix or associated with a reinforcement of a different nature. Such a material includes an upper layer 6 and a lower layer 7. Such upper 6 and lower 7 layers make it possible to create cohesion of and protect the structure of the composite material. To decrease, or even eliminate, a portion of kinetic energy propagated and created by an impact or shock C, the composite material according to the invention comprises means 8 arranged to diffuse, substantially transversely, at least part of the kinetic energy $E_C$ induced by an impact on one of said layers, said means 8 cooperating on either side with the upper layer 6 and lower layer 7. The kinetic energy $E_C$ is thus propagated within said means, in all directions, advantageously perpendicular to the direction of the shockwave, as described in connection with FIG. 2b. Consequently, the shockwave C, since it is diffused, is gradually absorbed within said means, thus allowing a substantial decrease in the kinetic energy propagated toward a passenger's head. Ultimately, the shockwave C causes the partial or total breaking and/or destruction of the means 8. Such a composite material according to the invention makes it possible to absorb about thirty-five to forty additional percent relative to the typical protection solutions. The limits of the danger zones are thus pushed back considerably and the number of cerebral sequelae is ultimately decreased greatly when using a composite material according to the invention as insert 5 within motorcycle helmets 1.

Preferably, the diffusing means can consist of a network 8' of base elements assembled to one another and of cavities, said cavities also being known as interstices, forming a three-dimensional structure. The base elements are advantageously made up of a matrix made from a suitable material, said matrix being arranged in an assembly of edges, also referred to as beams, and optionally partitions, said edges and partitions forming the base elements and interacting with interstices, making it possible to form two-dimensional or three-dimensional structures together. The cavities or interstices are advantageously filled with air. Such a network 8' is advantageously characterized by a particular density: indeed, as opposed to a dense material made from the same component, the network has a much lower density for a same volume, this significant difference being explained by the presence of many cavities within the network. As non-limiting examples, considering that the cavities or interstices substantially have a circular or elliptical section, the diameter of the section of said cavities may be about ten micrometers to three millimeters, this dimension depending on the use of a material 5' according to the invention and the minimum quantity of kinetic energy $E_C$ to be absorbed. Preferably, such a diameter may be about one hundred to five hundred micrometers. As preferred but non-limiting examples, the total thickness of the composite material can be about 5 to 50 millimeters. Due to its particular architecture, said network 8' has particularly interesting mechanical properties in particular in terms of compression, allowing it to "dissipate" and/or absorb, for an equivalent stress level, a much higher quantity of kinetic energy $E_C$ relative to the equivalent dense material. Such mechanical properties are subsequent to a particular mechanical behavior when said network, and consequently the composite material 5' according to the invention, is subject to mechanical forces, and in particular compression forces causing the subsequent partial or total break, or even destruction, of the network 8' of elements. Such a mechanical behavior can be broken down into three main phases:

a first elastic loading phase after the application of a first mechanical stress threshold, causing a homogenous deformation of the architecture;
  a second phase after passing a so-called plasticity threshold, said threshold attesting to the elasticity limit of the material, constituting a damage and collapse plateau through the formation of plastic ball joints;
  a third so-called densification phase, comprising compacting and crushing of all of the cavities to ultimately cause the partial or total destruction of the base elements making up the network.

The architecture of the network 8' of base elements thus deforms homogenously to a certain deformation percentage. After said deformation percentage, the base elements move more in the zones close to the upper layer than those close to the lower layer, thus presenting the damage zones of said network. The damage zones are the precursors to the formation of localized shearing planes. "Shearing" refers to the effect of a force applied perpendicular to the axis of a base element. If we consider that the base element is square, the shearing phenomenon creates a deformation of the square into a parallelogram resulting from the application of a force on said square. The appearance of such shearing planes makes it possible to dissipate at least part of the kinetic energy within said network 8' of base elements. The structure of all or part of the base elements may subsequently break, allowing the diffusion of the kinetic energy $E_C$ within the network 8'.

Two example embodiments of such networks are described in connection with FIGS. 3a and 3b.

Advantageously, the network 8' of base elements of the composite material 5' according to the invention can be regular, the base elements being identical. Such a network is also described as an ordered network. Such a configuration makes it possible to facilitate the manufacture of the network and decrease the costs thereof. Said network 8' may thus be made up of base elements, with no preferred orientation, distributed homogenously. The base elements can alternatively be identical and oriented in the same way. According to this particular configuration, the cavities or interstices can thus advantageously have a shape substantially close to a pseudo-sphere. Consequently, a composite material 5' according to the invention may be described as an "isotropic material," since such a network 8' does not have a preferred orientation and consequently, the mechanical properties do not depend on the orientation of the base elements. As previously described, during the application of a compressive force, shearing planes are formed. Such shearing planes are established randomly, since the network of base elements is considered regular, the base elements being identical and having no preferred orientation. As previously specified, the appearance of such shearing planes makes it possible to dissipate at least part of the kinetic energy within said network 8' of base elements. The structure of all or part of the base elements can subsequently break, and ultimately cause the destruction of said structure, allowing the diffusion of the kinetic energy $E_C$ within the network 8'.

Alternatively, preferably but non-limitingly, as described in connection with FIGS. 3a and 3b, the network 8' of base elements of the composite material 5' according to the invention can be random. Such a network is also described as an unordered network. Such a network 8' has an irregular structure. Within said network, the base elements can be different. Alternatively or additionally, they can be distributed randomly and have a particular orientation. According to this particular configuration, the cavities or interstices can thus advantageously have a shape substantially close to an ellipsoid. Conversely, a composite material according to the invention may be described as an "anisotropic material," since the base elements of such a network may have a preferred orientation and consequently, the mechanical properties can depend on the orientation. As previously described, when a compressive force is applied, shearing planes are formed. Such shearing planes are established primarily at zones with the smallest sections, or more specifically in zones with a low density, independently of the shape of the base elements. As previously specified, the appearance of such shearing planes makes it possible to dissipate at least part of the kinetic energy within said network 8' of base elements. The structure of all or some of the base elements can subsequently break, ultimately allowing the diffusion of the kinetic energy $E_C$ within the network 8'.

In order to facilitate the deformation of the composite material according to the invention, as described in connection with FIG. 3b, the network of base elements can include one or several rods. Alternatively or additionally, the network of base elements may include at least one cell. When the network of base element includes at least one cell, different types of base elements can be used, for example, but not limited to, a tetrahedron, a triangular, hexagonal or rectangular prism, octahedron, etc. Irrespective of the shape or type of base elements used, the invention sets out, preferably but non-limitingly, that the cavities and base elements can respectively each occupy fifty percent of the overall volume of the network of a composite material according to the invention. Alternatively but non-limitingly, the network 8' of elements of a composite material according to the invention may advantageously include a honeycomb structure, optionally with three levels. Alternatively, advantageously but non-limitingly, the network 8' of elements of the composite material according to the invention may include an assembly of spheres with different dimensions.

Furthermore, the upper layer 6, the lower layer 7 and the network 8' of base elements can be made up of the same material. The use of an identical material to form the composite material 5' makes it possible to simplify the manufacturing methods, and consequently to decrease the manufacturing time and costs. Such a material must advantageously be formed to ensure the mechanical behavior necessary for the substantially transverse diffusion of all or part of the kinetic energy within the network of base elements. Subject to a substantial plastic deformation, such a material must allow the total or partial break, or even destruction, of the base elements making up the network 8'. By way of non-limiting examples, such a material may advantageously comprise a mixture of one or several synthetic polymers, such as aliphatic polyesters, in particular poly-L-lactic acid, polycaprolactone, polyisocyanate, polymethacrylate or polycarbonate, etc., or natural polyamines and/or polyamines optionally filled with glass or aluminum. The composite material may optionally be made up of a polyurethane foam, potentially of the PORON type or a silicone gel. Preferably but non-limitingly, at least the network 8' of base elements can be made up of such a mixture. The use of metals and/or ceramic in combination with such synthetic polymers can also be considered. Furthermore, several additives, fillers or fibers can be added to said mixture. A composite material according to the invention cannot be limited to its component material(s).

Advantageously, the upper layer 6 and the lower layer 7 can form a single and same entity, encircling the means for diffusing the kinetic energy $E_C$, and more particularly the network 8' of base elements. The upper and lower layers thus form a single and same enclosure, thus making it possible to facilitate the production of inserts for different protection devices while allowing the formation of a sealed chamber. Such a chamber performs a sealing function when it prevents the passage of any fluid toward the outside. Preferably but non-limitingly, the sealing provided by the upper 6 and lower 7 layers can be double and static, i.e., said sealing is provided from the inside toward the outside of the chamber and vice versa.

To increase the diffusion capacity of all or part of the kinetic energy within a composite material according to the invention, the diffusing means 8 may further include a fluid flowing within the cavities of the network. Throughout the document, "fluid" refers to any deformable material environment made up primarily of liquid. The invention should not be limited to "pure" liquids or gases. It may also comprise a liquid including microscopic or macroscopic beads or particles. Preferably but non-limitingly, the fluids may advantageously be non-Newtonian, since such fluids are subject to shearing phenomena. Indeed, by opposition, Newtonian fluids, this category primarily encompassing water, air and certain oils, are not subject to shearing phenomena. The invention advantageously sets out that the fluid can be compatible with the base elements making up the diffusing means 8. "Compatible fluid" refers to any fluid being chemically inert, i.e., not reacting with the material making up the base elements. Preferably but non-limitingly, the fluid may have the property of being rheo-thickening, i.e., the viscosity of the fluid increases when the latter is sheared, allowing better absorption of the kinetic energy. Furthermore, when the network of base elements is random, the diffusion of the fluid then becomes asymmetrical, thus allowing a better diffusion of all or part of the kinetic energy induced by a shock.

Alternatively, advantageously but non-limitingly, the fluid can be made up primarily of a gel. A "gel" refers to a three-dimensional assembly of solids, advantageously in the form of polymers, solubilized within a fluid substance. Such a fluid substance may advantageously be liquid or gas. Such a gel also has the particularity of not having any flow in the stable state. Preferably but non-limitingly, such a gel may advantageously be a hydrogel, i.e., the substance allowing solubilization may advantageously be water.

Additionally, the fluid may occupy, preferably but non-limitingly, thirty to sixty percent of the space formed by the cavities of the network. Such proportions in principle make it possible to avoid any crushing phenomenon and prevent the damage, or even complete destruction, of the composite material according to the invention while increasing the power of said material to absorb kinetic energy. Indeed, above such a threshold of sixty percent, the fluid, through its occupation of the space formed by the cavities, can create a crushing phenomenon and effect, this phenomenon and this effect preventing the development of shearing planes and, consequently, creating compression of the fluid within the cavities to ultimately cause destruction by explosion of a composite material according to the invention. Below the threshold of thirty percent, the fluid does not guarantee an actual impact on the absorption and/or dissipation of the kinetic energy by adding such a fluid.

Furthermore, the invention relates to a method for manufacturing a composite material according to the invention. To simplify the manufacture methods, and thus save time and decrease costs, the method for manufacturing a composite material according to the invention comprises a step for extruding the network of base elements and cavities. Extrusion is a method for manufacturing a material commonly used in the field of composite materials and particularly suitable for manufacturing a random network. In the case of a composite material according to the invention, the extrusion step primarily consists of:

first, melting the substance(s) making up the network;
second, adding an appropriate and compatible expansion agent, such as, but not limited to, isobutene to the melted substance(s);
in a third step, passing the substance(s) within a die, or more commonly called extruder.

In order to allow the creation of the cavities within the network, the temperature can advantageously, but non-limitingly, be higher than the boiling temperature of the expansion agent.

However, the invention cannot be limited to this method alone. Alternatively, the network of base elements can advantageously be manufactured by using other methods, such as, but not limited to, injection molding, thermoforming, etc., said methods allowing the formation of a regular network of base elements. By way of non-limiting examples, such methods may optionally include powder sintering steps.

Furthermore, the invention relates to a protection device comprising an insert. To decrease the propagation of the kinetic energy created by a shock and thus increase the protective power of said device, said insert is made up of a composite material according to the invention. Such an insert can advantageously be positioned within the protection device, alone or in combination with other inserts also performing absorption, diffusion or dispersion functions of all or part of the kinetic energy induced by a shock. Alternatively or additionally, it may also be placed on any walls or partitions of a protection device.

More particularly, the invention relates to a motorcycle helmet. Such a helmet may optionally be suitable for being used in connection with any type of vehicle, for example, but not limited to, a racecar, a go-kart, a scooter, a four-wheeler or any other vehicle requiring wearing a helmet.

Figure 4:
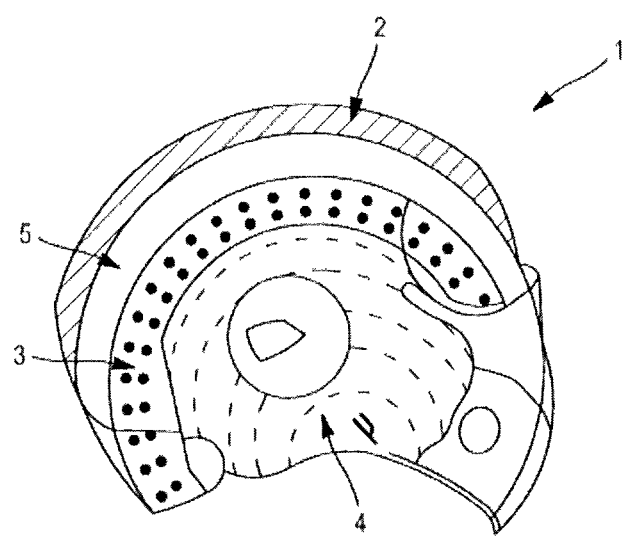
FIG. 4 illustrates a sectional view of one embodiment of a motorcycle helmet according to the invention.

FIG. 4 shows one embodiment of the motorcycle helmet 1 according to the invention.

As previously specified, like so-called traditional motorcycle helmets, a motorcycle helmet 1 according to the invention includes an outer cap or shell 2, allowing resistance to minor shocks, as well as customization of said helmet, an inner cover 3 positioned between said outer cap, said cover being designed to absorb at least part of the kinetic energy induced by a shock, and comfort padding 4, allowing improved contact between the user's head and the other components of the helmet. Although they perform a protective function, the so-called traditional helmets are not sufficient. To decrease the propagation of the kinetic energy created by a shock toward the head of the motorcycle passenger and thus to increase the protective power of said motorcycle helmet 1, the latter includes an insert 5 made from a composite material according to the invention, said insert generally being positioned between the outer cap 2 and the inner cover 3. Additionally, said insert 5 may also and advantageously include a sealing chamber encircling said material.

The combination of the inner cover 3 and the insert 5 thus guarantees a substantial decrease in the quantity of kinetic energy transmitted toward the user, of about thirty to thirty-five additional percent relative to so-called traditional helmets, makes it possible to push back the danger zone limit considerably and thus to protect a large number of users from cerebral sequelae. Alternatively, it is also possible to provide that the insert 5 is placed between the inner cover 3 and the comfort padding 4: the invention cannot be limited to the positioning of such an insert 5 within a motorcycle helmet 5 according to the invention relative to the other elements making up said helmet.

Furthermore, the insert 5, in light of the other elements of a helmet, may have different dimensions depending on the use for which said helmet is utilized. Indeed, the volume occupied by said insert 5 within such a helmet 1 may be defined, by way of non-limiting example, based on the type of vehicles for which it will be used. This volume may also depend on the speed that such a vehicle may reach. If one considers the combination of the inner cover 3 with the insert 5 as a global volume, said insert 5 may preferably, but non-limitingly, occupy one third of the overall volume, while the inner cover 3 can occupy two thirds of such an overall volume. The invention nevertheless cannot be limited to such dimensions.

As previously described, a composite material making up the insert 5 performs its diffusion function by the destruction of these means to diffuse all or part of the kinetic energy created by a shock. Like the so-called traditional helmets, when a substantial shock occurs, the latter causes irreversible damage, or even destruction of the motorcycle helmet. It is thus necessary to change the helmet to ensure that the latter still performs its function of protecting a user's head. Thus, additionally, to attest to the compliance of a motorcycle helmet according to the invention, the latter may further comprise indicator means (not shown in the figures) for the integrity of the composite material making up the insert. Since the insert is generally encircled between the outer cap 2, inner cover 3 and/or comfort padding 4, such means make it possible to attest that the insert has not undergone irreversible damage altering its functionality, even though the insert is outside visual range.

According to a first alternative, the indicator means may include a negative pressure valve associated with a means delivering an indication perceptible by humans. The combination of a negative pressure valve coupled with visual means allows a quick inspection of the motorcycle helmet according to the invention, which may, by way of non-limiting example, correspond to an inspection done by a parent wishing to inspect a child's helmet, or by law enforcement during road inspections. The operation of this combination is simplified in principle: when the composite material experiences a substantial shock or when it is already damaged, the negative pressure valve, advantageously made up of a gate, opens to convey a gas or liquid to the means delivering a visual indication, the latter advantageously including a substance "reacting" with said gas or liquid. As a non-limiting example, such a means delivering a visual indication may be a colored sticker, i.e., said sticker can change colors in contact with a specific liquid or gas, or even a display interface, optionally with a smaller size, allowing the display of specific letters or symbols depending on the state of a motorcycle helmet according to the invention.

Alternatively or additionally, the indicator means include a radiopaque substance: such a radiopaque substance makes it possible to conduct a detailed inspection of the insert within a motorcycle helmet according to the invention. Indeed, it is possible to provide, advantageously but non-limitingly, that said radiopaque substance is contained directly within the material making up the network of base elements. The radiopaque nature is the property that a substance has not to allow certain types of rays, more particularly x-rays, to penetrate. During an x-ray analysis, only the radiopaque substance will be visible, thus making it possible to check the condition of the insert, and consequently of a motorcycle helmet according to the invention. The use of such a substance may in particular prove very useful when inspecting the quality of motorcycle helmets at the end of the manufacturing process.

The invention has been described during its use as an insert for a protection device such as a motorcycle helmet. It may also be implemented for all types of personal protection elements, such as car or at-risk sports helmets, knee pads, shin guards, elbow guards, etc., or passive protection elements in locomotive means, such as car or truck bumpers.

It is also possible to consider a plurality of inserts comprising the composite material being associated in series or in parallel to improve the effectiveness of the protection.

Other modifications may be considered without going beyond the scope of the present invention defined by the appended claims.

The invention claimed is:

1. A protection device, comprising:
an outer portion; and
an insert disposed within the outer portion, wherein said insert is made from a composite material consisting of an upper layer, a lower layer, and a middle layer, said middle layer comprising a network of base elements assembled to one another so as to define air-filled cavities between the upper layer and the lower layer, said base elements being arranged to break under the effect of the kinetic energy induced by an impact on one of said upper or lower layers, said middle layer cooperating on either side with the upper layer and the lower layer,
wherein the protection device further includes a fluid flowing within the air-filled cavities,
wherein the fluid is made up primarily of a gel,
wherein the fluid occupies thirty to sixty percent of a volume formed by the air-filled cavities, and
wherein the gel encapsulates at least a portion of the base elements.

2. The protection device according to claim 1, wherein the upper layer and the lower layer form a single piece, encircling the middle layer.

3. The protection device according to claim 1, wherein an arrangement of the network of base elements prior to an impact on one of said upper or lower layers is irregular.

4. The protection device according to claim 1, wherein the network of base elements includes at least one cell.

5. The protection device according to claim 1, wherein the upper layer, the lower layer and the network of base elements are formed from a same material.

6. The protection device according to claim 1, wherein the protection device is a motorcycle helmet which further comprises an inner cover and a comfort padding, said outer portion comprises an outer cap, said inner cover is positioned between said outer cap and said comfort padding, and said insert is positioned between the outer cap and the inner cover.

* * * * *